United States Patent
Cymbal et al.

(10) Patent No.: US 7,178,833 B2
(45) Date of Patent: Feb. 20, 2007

(54) STEERING COLUMN ASSEMBLY WITH VERTICAL CAPSULES

(75) Inventors: William D. Cymbal, Freeland, MI (US); Richard K. Riefe, Saginaw, MI (US); Richard E. Woycik, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 300 days.

(21) Appl. No.: 10/800,922

(22) Filed: Mar. 15, 2004

(65) Prior Publication Data

US 2005/0200113 A1    Sep. 15, 2005

(51) Int. Cl.
*B62D 1/00* (2006.01)
(52) U.S. Cl. .................................... 280/777
(58) Field of Classification Search ............ 280/777, 280/779, 775; 74/492, 493
See application file for complete search history.

(56) References Cited

U.S. PATENT DOCUMENTS

| 4,452,096 | A |  | 6/1984 | Workman |  |
|---|---|---|---|---|---|
| 5,669,634 | A |  | 9/1997 | Heinzman et al. |  |
| 5,704,641 | A | * | 1/1998 | Shimizu et al. | 280/775 |
| 5,944,348 | A |  | 8/1999 | Boyle, III et al. |  |
| 6,134,982 | A |  | 10/2000 | Takabatake |  |
| 6,183,012 | B1 |  | 2/2001 | Dufour et al. |  |
| 6,419,269 | B1 | * | 7/2002 | Manwaring et al. | 280/775 |
| 6,450,532 | B1 | * | 9/2002 | Ryne et al. | 280/777 |
| 6,578,872 | B2 |  | 6/2003 | Duval et al. |  |
| 6,616,185 | B2 | * | 9/2003 | Manwaring et al. | 280/775 |
| 6,863,306 | B2 | * | 3/2005 | Bechtel et al. | 280/775 |
| 6,948,741 | B2 | * | 9/2005 | Manwaring et al. | 280/775 |
| 2002/0033593 | A1 | * | 3/2002 | Hancock et al. | 280/777 |
| 2003/0000330 | A1 | * | 1/2003 | Murakami et al. | 74/492 |
| 2004/0231450 | A1 | * | 11/2004 | Yamamura | 74/492 |
| 2004/0232685 | A1 | * | 11/2004 | Gatti et al. | 280/777 |

* cited by examiner

*Primary Examiner*—Paul N. Dickson
*Assistant Examiner*—Drew J. Brown
(74) *Attorney, Agent, or Firm*—Michael D. Smith (57) ABSTRACT

A steering column assembly is disclosed featuring a steering column carried by a release bracket having parallel connecting walls interposed between spaced sidewalls of a mounting bracket, which is for attachment to a vehicle subassembly. Shear capsules are releasably disposed within respective rearwardly-opening primary notches on the connecting walls. The capsules are connected to the mounting bracket by being disposed in respective secondary notches on the sidewalls. The capsules shear in response to an axial shear force above a predetermined threshold value and release the connecting walls to permit the steering column to collapse.

16 Claims, 8 Drawing Sheets

STEERING COLUMN ASSEMBLY WITH VERTICAL CAPSULES

FIELD OF THE INVENTION

The subject invention relates to a vehicle steering assembly having release and energy-absorbing components moveable in response to a crash condition.

BACKGROUND OF THE INVENTION

Energy-absorbing release mechanisms are known for use with collapsible steering columns. Such release mechanisms not only allow the steering column to collapse in response to a sufficiently large impact on the column, but also absorb a portion of the forces generated as a result of such an impact.

Certain release mechanisms exist in the art that incorporate shear capsules through which plastically deformable shear pins extend. Injected into the capsules during the manufacturing process, the pins shear in response to an impact on the column and release the capsules—and the column connected thereto—to permit the column to collapse. Although such mechanisms are effective in releasing steering columns in response to significant collision events, it would be desirable from the standpoint of both increasing production efficiency and reducing manufacturing costs for the components of such mechanisms to interconnect the steering column with the support structure of a vehicle in a manner that enhances the ability of the mechanisms to withstand force components applied thereto from multiple directions without inadvertently shearing and causing the column to collapse.

SUMMARY OF THE INVENTION AND ADVANTAGES

The present invention provides a steering column assembly that includes a mounting bracket with a plate having parallel sidewalls extending therefrom. A flange extends laterally from each of the sidewalls for attachment to a vehicle subassembly. The assembly also includes a release bracket having spaced parallel connecting walls interposed between the sidewalls. At least one of the connecting walls has a rearwardly-opening primary notch. A steering column having an outer jacket is carried by the release bracket. A shear capsule is disposed within the primary notch and connected to the mounting bracket. The capsule normally resists collapse of the steering column and shears in response to a collision event for releasing the connecting wall in a direction to collapse the steering column to permit the steering column to collapse. At least one of the sidewalls includes a secondary notch. The shear capsule is connected to the mounting bracket by being disposed within the secondary notch for interconnecting the connecting wall with the sidewall.

Accordingly, the subject invention overcomes the limitations of the prior art by providing shear capsules disposed within respective pairs of primary and secondary notches for interconnecting a release bracket to a mounting bracket to permit release and collapse of a steering column in response to a crash condition. The manner in which the shape of each primary notch closely conforms to the shape of a selected one of the shear capsules, combined with the close fit achieved by securing the capsule within the secondary notch minimizes dimensional clearance between each pair of aligned primary and secondary notches and the capsule disposed therein. Movement and vibration of the capsules within the pairs of notches is also reduced. This reduces the likelihood that the connecting walls will inadvertently become disengaged from the capsules in response to a force on the column generated by a source other than the collision event, and discourages premature collapse of the steering column.

BRIEF DESCRIPTION THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
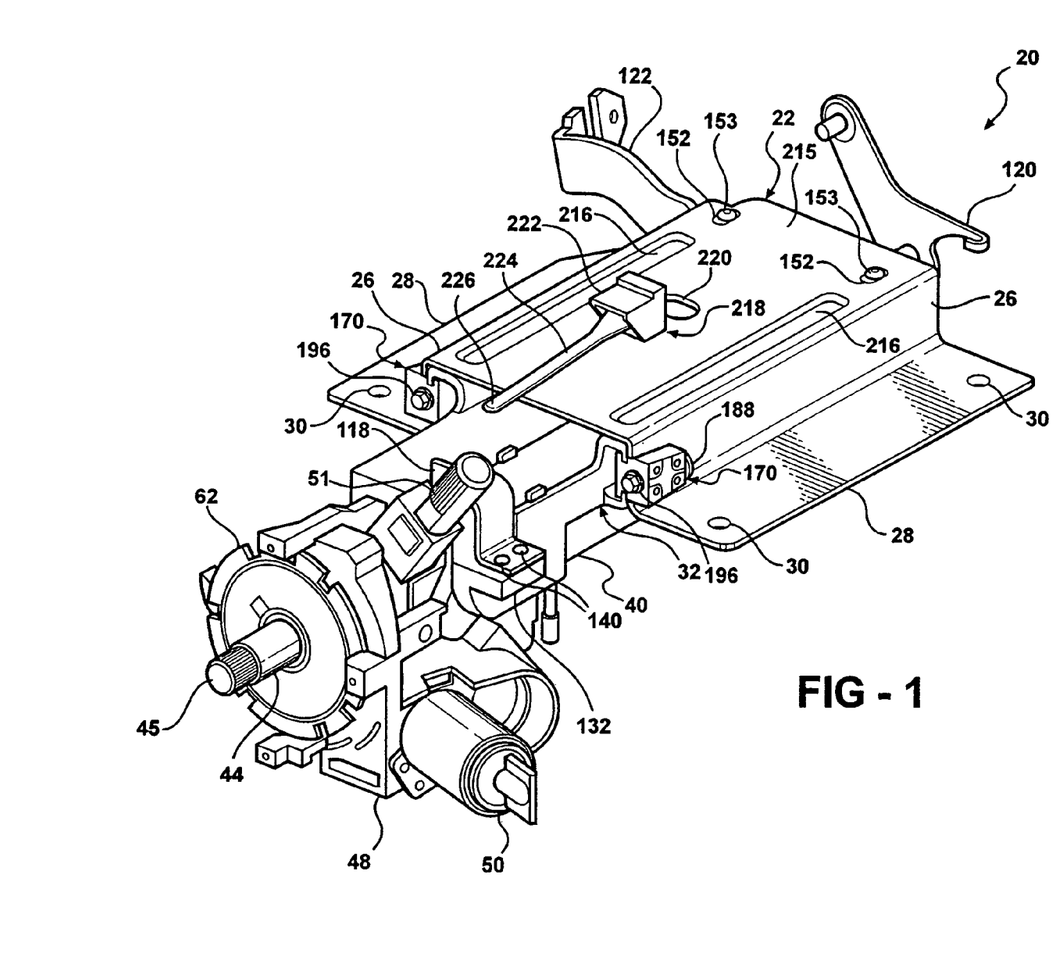
FIG. 1 is a perspective view of a steering column assembly according to one embodiment of the present invention.
Figure 4:
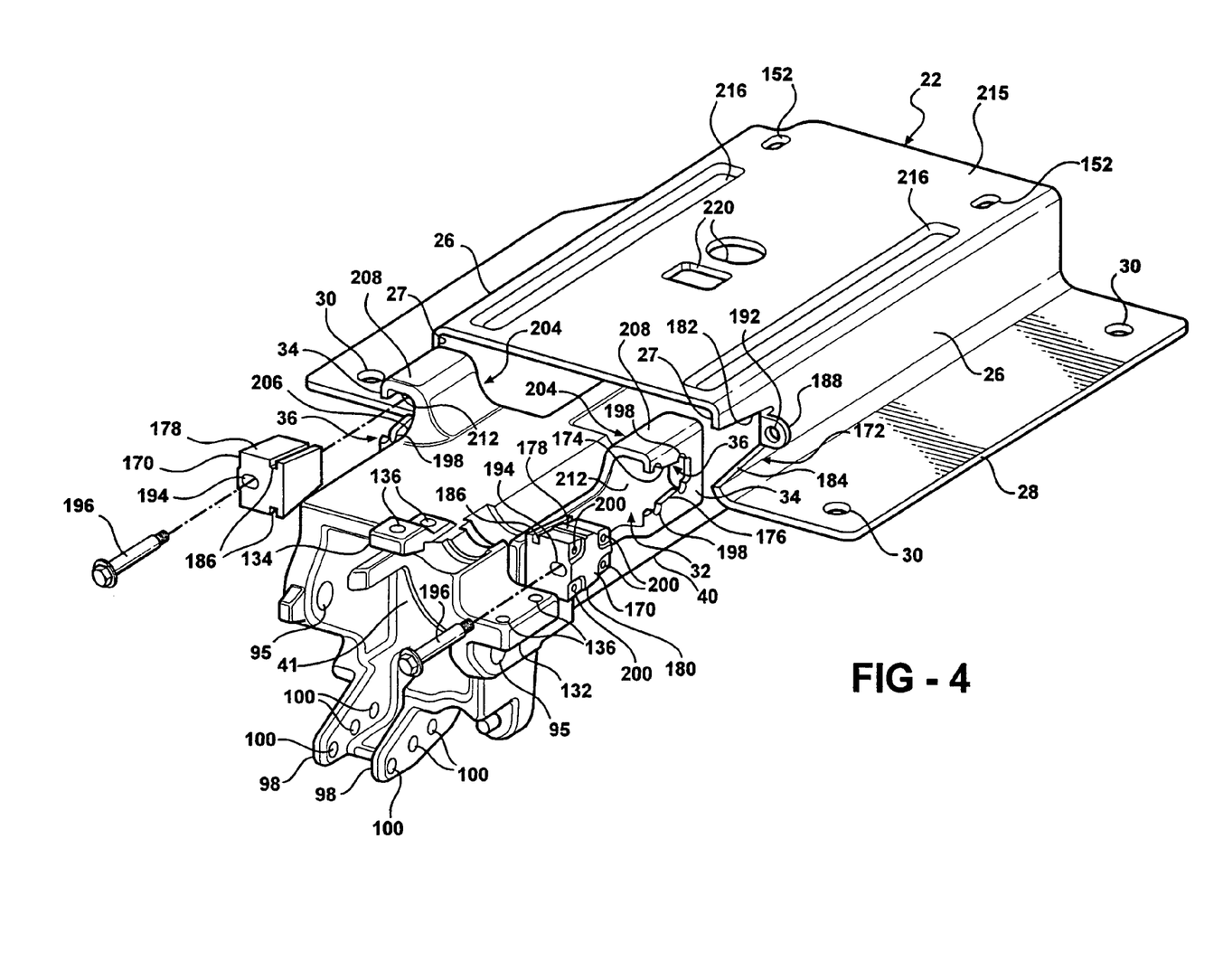
FIG. 4 is an exploded perspective view of the assembly shown in FIG. 1 with the steering column and transmission linkage assembly removed.

Referring to the Figures, wherein like numerals indicate like or corresponding parts throughout the several views, a steering column assembly is generally shown at 20 in FIG. 1. The assembly 20 includes a mounting bracket 22 with longitudinally-extending, spaced sidewalls 26. The sidewalls 26 have inner surfaces 27 facing one another (see FIG. 4). A flange 28 extends laterally from each of the sidewalls 26 for attachment to a vehicle subassembly. Each flange 28 has spaced holes 30 extending therethrough for receiving complementary bolts (not shown) to attach the flange 28 to the vehicle subassembly. As shown in FIGS. 1 and 4, the assembly 20 also includes a release bracket 32 having longitudinally extending spaced parallel connecting walls 34 interposed between the sidewalls 26. At least one, or as disclosed, each connecting wall 34 includes a rearwardly-opening primary notch 36.

Figure 3:
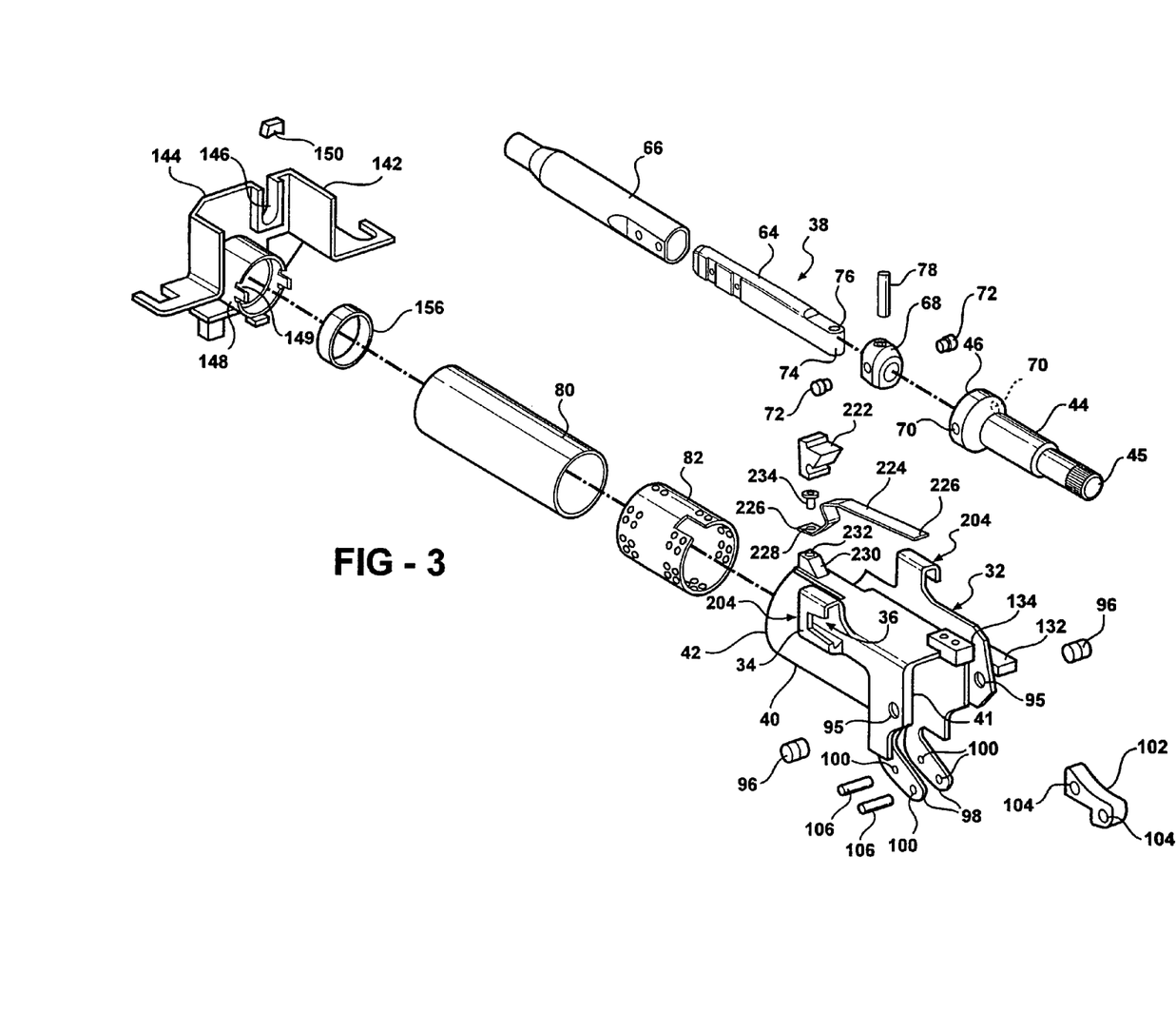
FIG. 3 is another exploded perspective view of selected components of the steering column of the assembly.

As shown in FIGS. 1 and 3, the assembly 20 also includes a steering column 38 mounted to the release bracket 32. An upper jacket 40 is carried by, or as disclosed, integrally formed with the release bracket 32. The upper jacket 40 extends between forward and rear openings 41 and 42, respectively. The steering column 38 extends through the upper jacket 40, and includes an upper shaft 44 having proximal and distal ends 45 and 46. A control housing 48 is disposed about the upper shaft 44 adjacent the proximal end 45.

Figure 2:
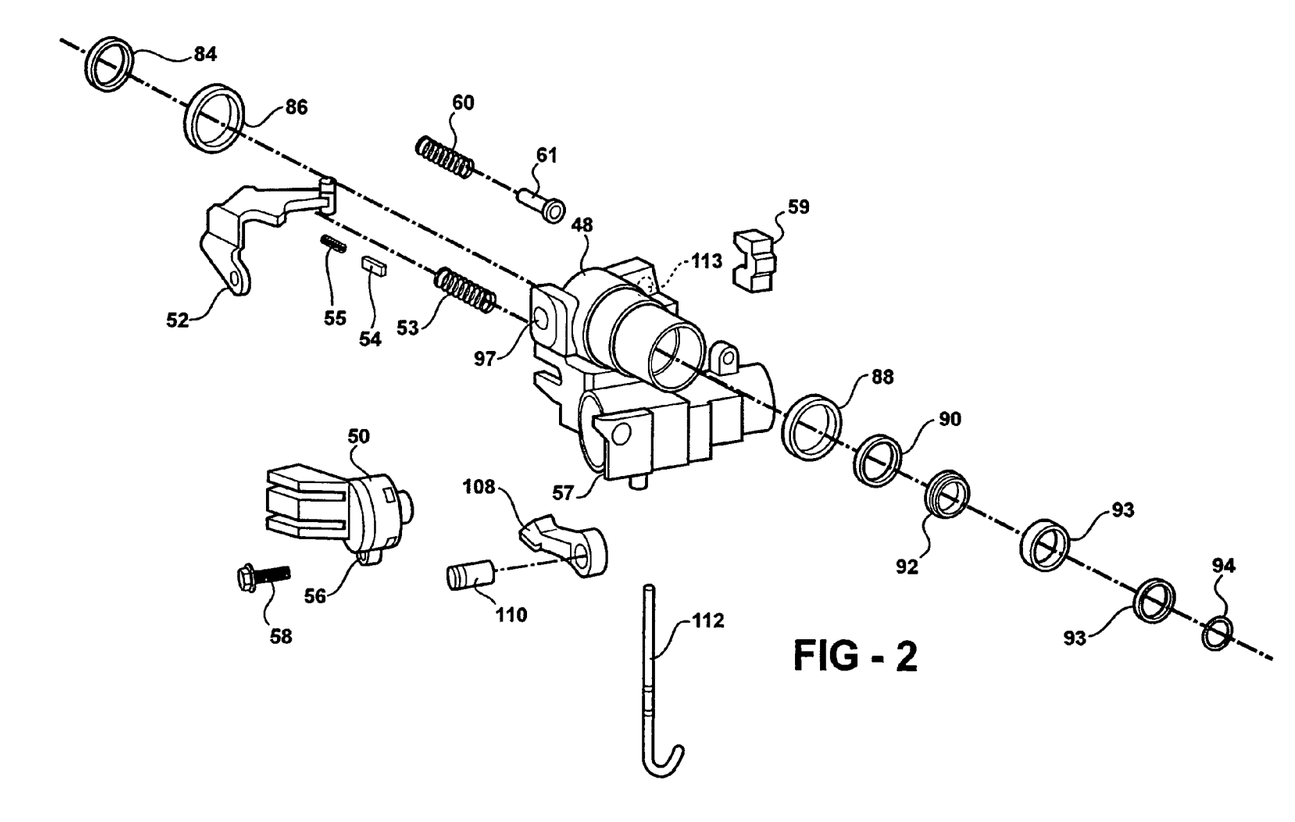
FIG. 2 is an exploded perspective view of selected components of the steering column of the assembly shown in FIG. 1.

Referring to FIGS. 1 and 2, the control housing 48 receives complementary control switches and, where required, associated control arms or other devices for actuating or otherwise operating the switches. Such switches may include, but are not limited to those for controlling turn signals, lights, windshield wipers and the transmission of the vehicle. An ignition switch assembly 50, a shift lever clevis 51, and a tilt lever overmold 52 are carried by the control housing 48. A compression spring 53, a force pin 54 and a force pin compression spring 55 interconnect the tilt lever overmold 52 and the control housing 48. The ignition switch assembly 50 has a bore 56 therethrough, which is aligned with a bore 57 in the housing 48. A screw 58 extends through the bores 56, 57 to connect the assembly 50 to the housing 48. A tilt bumper 59, tilt spring 60 and spring guide 61 are likewise carried by the housing 48. As is shown in FIG. 1, a rotary connector 62 is disposed about the upper shaft 44 and positioned intermediate the proximal end 45 thereof and the control housing 48 for being operatively connected to a steering wheel (not shown) after the wheel is mounted on the proximal end 45.

Referring now to FIG. 3, the steering column 38 also includes a lower shaft 64 disposed within a tubular shaft 66. A cardan joint cage 68 is received within the distal end 46 of the upper shaft 44. The distal end 46 has holes 70 therethrough. Set screws 72 are disposed within the holes 70 to interconnect the cardan joint cage 68 and the distal end 46. The lower shaft 64 has an end 74 with a hole 76 therethrough. A connecting pin 78 is disposed within the hole 76 for interconnecting the lower shaft 64 and the cardan joint cage 68.

The lower shaft 64, tubular shaft 66, upper shaft 44, a lower column jacket 80, and a ball retaining sleeve 82 are coaxially disposed within the upper jacket 40 such that the proximal end 45 of the upper shaft 44 extends through the forward opening 41.

Referring again to FIG. 2, a first inner race 84, a first bearing assembly 86 and the control housing 48 are disposed coaxially in series about the upper shaft 44. A second bearing assembly 88, a second inner race 90, an upper bearing inner race seat 92, an upper bearing spring assembly 93, and a bearing retainer 94 are likewise coaxially disposed in series about the upper shaft 44 intermediate the control housing 48 and the rotary connector 62 shown in FIG. 1.

Referring to FIGS. 2 and 3, the control housing 48 is pivotally connected to the upper jacket 40. Specifically, the upper jacket 40 includes spaced pivot bores 95. Pivot pins 96 are disposed within the bores 95 and engage openings 97 on the control housing 48 to pivotally connect the control housing 48 to the upper jacket 40.

The upper jacket 40 also includes spaced brackets 98 extending from the forward opening 41. Each bracket 98 has spaced holes 100 therethrough. A steering wheel shoe 102 is interposed between the brackets 98 and includes bores 104, each of which is aligned with one of a pair of the holes 100 on the brackets 98. A spring pin 106 is disposed through each of the two groups of aligned holes 100 and bores 104. A steering wheel shoe lock 108 is interconnected by a shoe pin pivot 110 to the shoe 102 and control housing 48. An anti-rotation pin 112 is also disposed within the control housing 48 and cooperates with the steering wheel shoe 102, spring pin 106 and shoe lock 108 to selectively permit rotational movement of the steering wheel (not shown).

Referring again to FIG. 1, a transmission linkage assembly is also carried by the release bracket 32. The linkage assembly includes a shaft assembly. The shaft assembly is operatively connected to and extends between the shift lever clevis 51, a shift gate 118 and a lower shift lever 120. In addition, a shift cable bracket 122 is connected to the mounting bracket 22.

The shaft assembly includes an upper shift tube. A U-shaped shift tube clamp secures the upper shift tube to the release bracket 32. As is also shown in FIG. 4, the release bracket 32 includes attachment plates 132 and 134 having bores 136 extending therethrough. Fasteners 140 are received through the clamp and the bores 136 to secure the shift tube clamp to the plates 132, 134.

Referring to FIGS. 1 and 3, the mounting bracket 22 also includes a lower bearing adapter 142 for supporting the steering column 38 and transmission linkage assembly. The adapter 142 has a rear wall 144 with a recess 146 for receiving the shaft assembly therein and a cylindrical housing 148 having an opening 149 therethrough. A shaft bushing wedge 150 is disposed within the recess 146 after the shaft assembly is disposed therein. A bore 152 extends through the mounting bracket 22. A tapping screw 153 is disposed within the aligned bore 152 to connect the adapter 142 to the mounting bracket 22. A lower bearing sleeve 156 interconnects the lower column jacket 80 with the housing 148 about the opening 149.

The assembly 20 is shown in FIG. 4 with the transmission linkage assembly and steering column 38 removed. Referring to FIGS. 1, 4, 6–7, and 9–10, the assembly 20 includes shear capsules 170 for interconnecting the release bracket 32 and the mounting bracket 22. Each shear capsule 170 is removably disposed within a selected one of the primary notches 36 and is fixed to the mounting bracket 22. The capsules 170 couple and support the release bracket 32 against separation from the mounting bracket 22 in response to application of an axial shear force below a predetermined threshold value. The capsules 170 are also responsive to an axial shear force above the threshold value to cause the capsules 170 separate from the release bracket 32. This permits longitudinal movement of the release bracket 32 relative to the mounting bracket 22 in the direction of the shear force.

At least one, or as disclosed, each sidewall 26 of the mounting bracket 32 includes a secondary notch 172. Each shear capsule 170 is connected to the mounting bracket 22 by being disposed within a selected one of the secondary notches 172, which in turn interconnects the connecting wall 34 and the sidewall 26.

Figure 5:
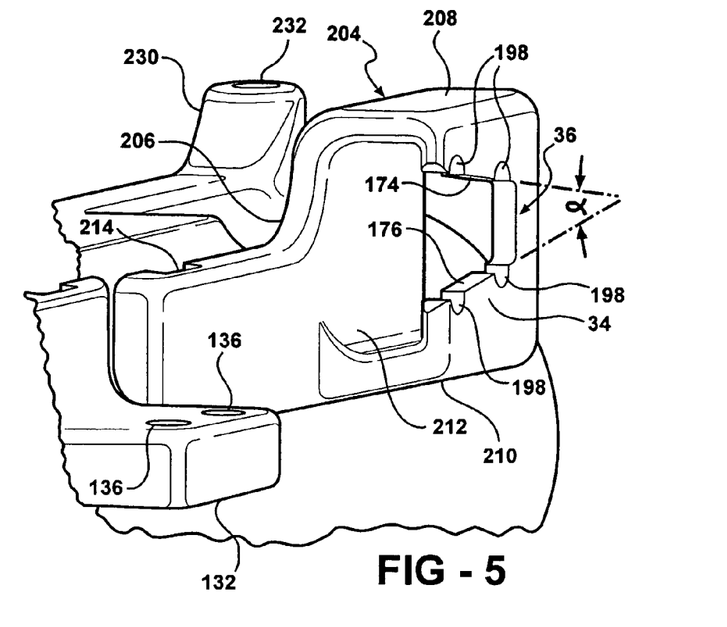
FIG. 5 is fragmentary perspective view of selected components in the release bracket of the steering column assembly.
Figure 6:
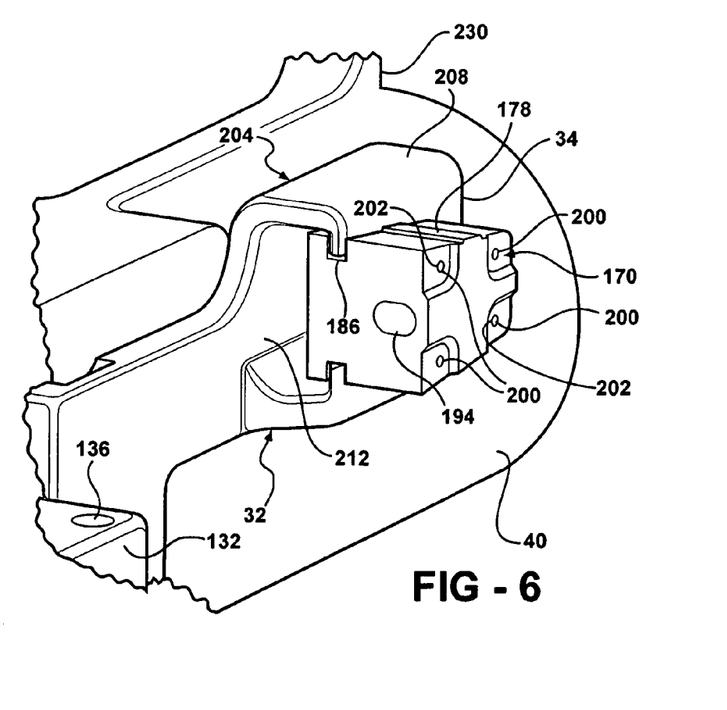
FIG. 6 is a fragmentary perspective view of the release bracket with a perspective view of a shear capsule received disposed within a primary notch.

The primary and secondary notches 36 and 172 have shapes complementary to the shapes of certain of the surfaces of the capsules 170. As is best shown in FIG. 5, each primary notch 36 has top and bottom edges 174 and 176, respectively, diverging in a rearward direction at a predetermined angle "α" to one another. Each capsule 170 has top and bottom surfaces 178 and 180 complementary to the respective top and bottom edges 174 and 176 of the primary notch 36. As is shown in FIG. 6, the top and bottom surfaces 178, 180 of the capsule 170 diverge in a rearward direction at the same angle "α" relative to one another as the respective top and bottom edges 174, 176 of the primary notch 36. This permits the top and bottom surfaces 178, 180 to slidably engage the respective top and bottom edges 174, 176 of the primary notch 36.

Figure 7:
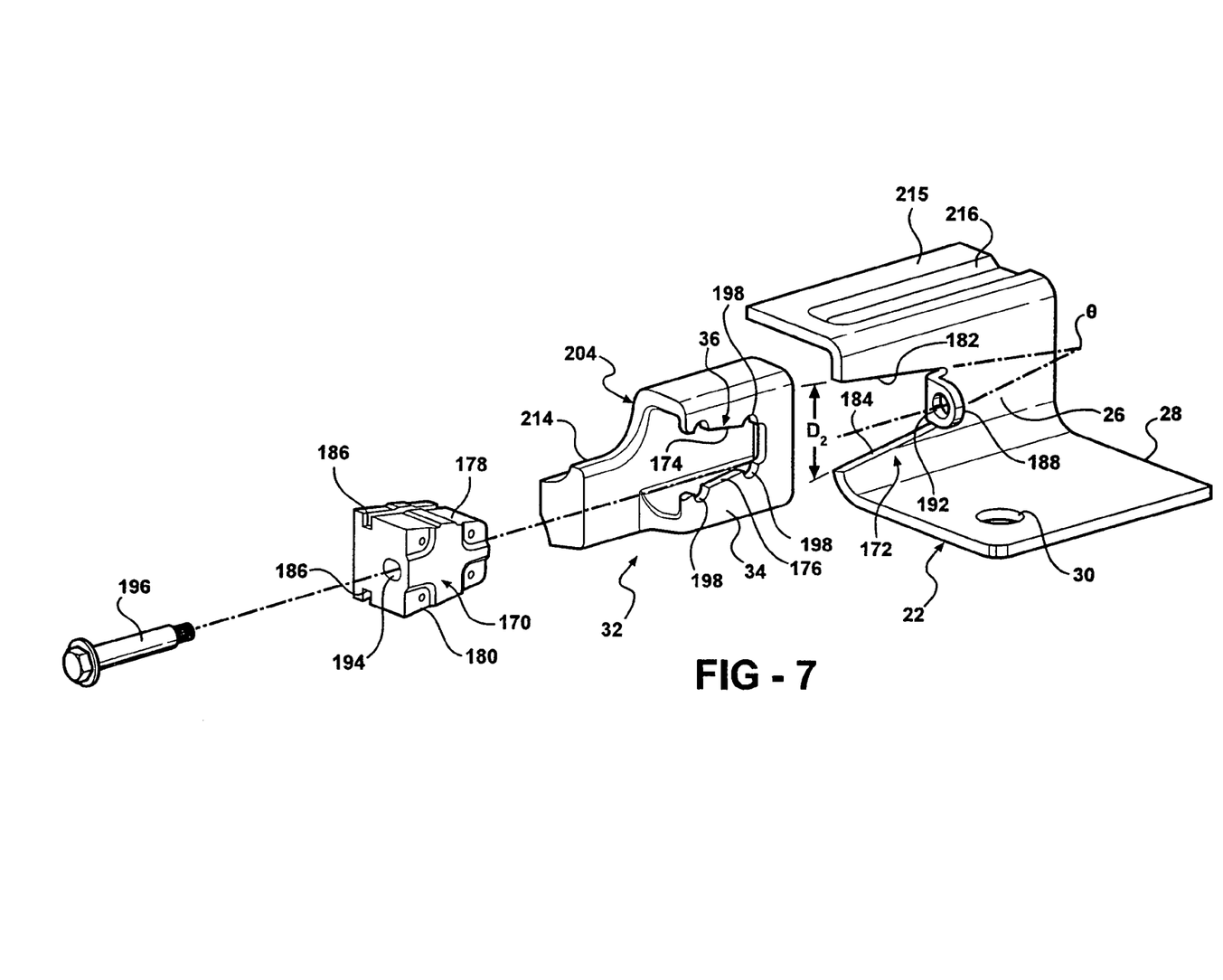
FIG. 7 is an exploded fragmentary perspective view of the mounting bracket and release bracket with an exploded perspective view of a shear capsule and a connecting bolt of the steering column assembly.
Figure 8:
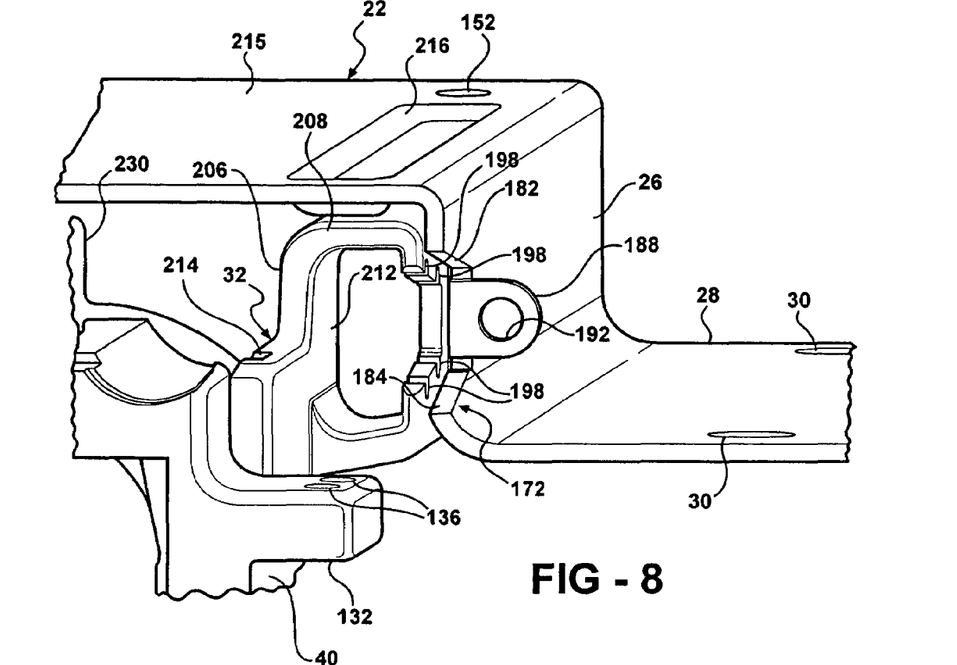
FIG. 8 is a fragmentary perspective view of the mounting and release brackets of the steering column assembly.
Figure 9:
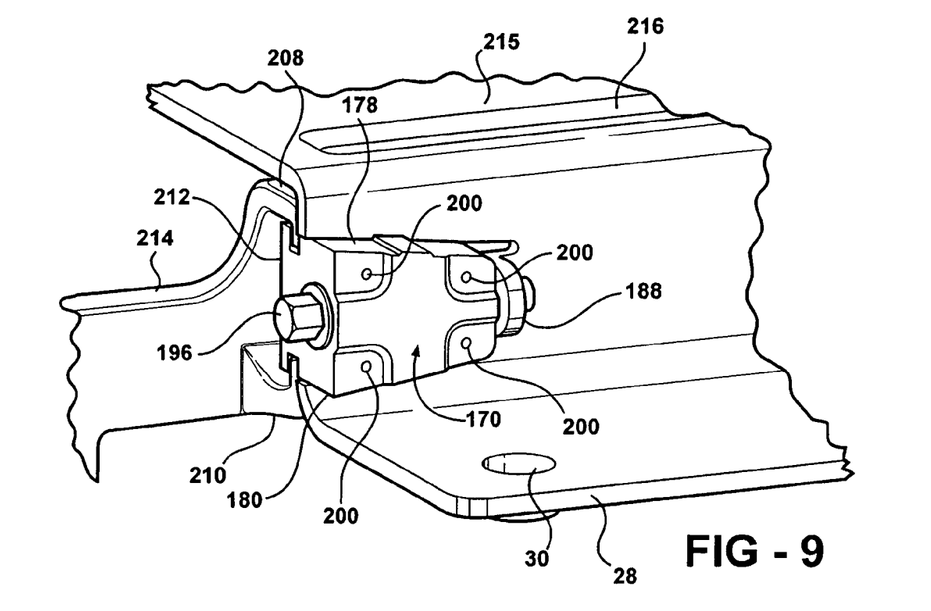
FIG. 9 is a fragmentary perspective view of the steering column assembly.
Figure 10:
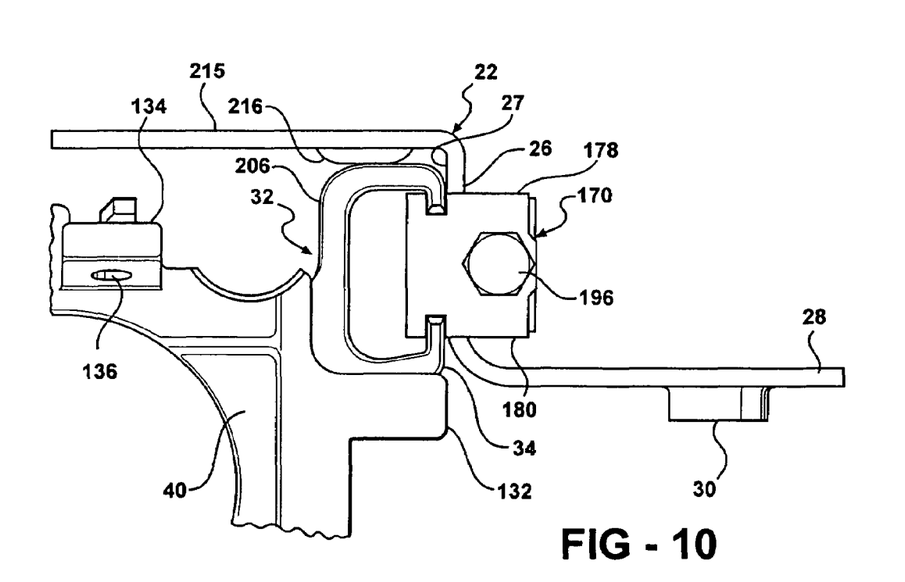
FIG. 10 is a partial front planar view of the steering column assembly.

Referring now to FIG. 7, each of the secondary notches 172 has upper and lower edges 182 and 184, respectively, that diverge in a rearward direction at a predetermined angle "θ" relative to one another. Although the upper and lower edges 182 and 184 may diverge at any angle, the angle "θ" shown in FIG. 7 is identical to the angle "α" at which the top and bottom edges 174, 176 of each primary notch 36 extend. The top and bottom surfaces 178, 180 of the capsules 170 have grooves 186 therein. The grooves 186 of each capsule 170 slidably engage the upper and lower edges 182, 184 of a selected one of the secondary notches 172. The depth "$D_1$" of each secondary notch 172 is less than the depth "$D_2$" of the primary notch 32 with which the secondary notch 172 is aligned to accommodate and achieve a conforming fit with the grooves 186 in the capsule 170. This enhances the stability of the capsules 170 by reducing the likelihood that the capsules 170 will inadvertently shear in the absence of a crash condition.

Referring now to Figures 1, 4, 7–8, and 9, the assembly 20 also includes tabs 188 for securing the capsules 170 to the mounting bracket 22. Each tab 188 is disposed on a selected one of the sidewalls 26 adjacent the secondary notch 172 and extends transversely from the sidewall 26 for abutting engagement with the capsule 170. Each of secondary notches 172 includes an end edge interconnecting the upper and lower edges 182, 184. The tab 188 extends from the end edge at a generally perpendicular angle to the sidewall 26.

Each tab 188 and capsule 170 have respective bores 192 and 194 extending therethrough. A bolt 196 is received within the bores 192, 194 to thereby rigidly anchor the capsule 170 to the tab 188. Although the bolts 196 may extend in any direction relative to the mounting bracket 22, each bolt 196 extends parallel to the longitudinal axis of the mounting bracket 22. Positioning the bolts 196 in parallel alignment with the longitudinal axis of the mounting bracket 22 ensures that no net force will be applied to the bolts 196 and transferred to the capsules 170 as result any force component applied in a direction perpendicular to the longitudinal axes of the bolts 196. This further reduces the likelihood that the connecting walls 34 will be inadvertently released from the capsules 170.

Each of the top and bottom edges 174, 176 of the primary notches 36 includes one, or as disclosed, a plurality of indentations 198, and each capsule 170 includes one, or as disclosed, a plurality of holes 200. A shear pin 202 is disposed within each hole 200 and extends through a selected one of the indentations 198. The shear pins 202 normally resist collapse of the steering column 38 and shear in response to the collision event to release the connecting walls 34 from the capsules 170.

Incorporating the secondary notches 172 into the sidewalls 26 of the mounting bracket 22 permits the shear capsules 170 to be anchored within the paired primary and secondary notches 36, 172 and connected to the tabs 188 using the bores 192, 194 during the manufacturing process prior to injecting the shear pins 202 into the holes 200. This decreases the likelihood that the pins 202 will inadvertently shear or that the structural integrity of the pins 202 will otherwise be compromised during the manufacturing process.

As best shown in FIG. 5, the release bracket 32 also includes at least one, or as disclosed, a pair of housings 204 for receiving the respective capsules 170 therein. Each housing 204 is formed from a parallel segment 206 positioned in spaced relation from a selected one of the connecting walls 34. Top and bottom wall segments 208, 210 interconnect the parallel segment 206 with the connecting wall 34 to define a chamber 212 within which a selected one of the capsules 170 is received. One of a pair of integral support arms 214 extends from each of the housings 204 for interconnecting the release bracket 32 with the upper jacket 40.

Referring to FIGS. 1, 4, and 7–10, the mounting bracket 22 includes a plate 215. The plate 215 has at least one, or as is disclosed, two guides 216 extending therefrom. Each guide 216 frictionally engages a selected one of the housings 204 for guiding movement of the housing 204 upon release of the connecting wall 34 from the capsule 170. Although the guides 216 may have any suitable shapes and dimensions, each guide 216 comprises a ridge that extends parallel to the longitudinal axis of the mounting bracket 22.

As shown in FIGS. 1, 3, and 4, the assembly 20 also includes an energy absorbing mechanism 218 that interconnects the release bracket 32 and the plate 215 for absorbing energy upon movement of the release bracket 32 relative to the mounting bracket 22 in response to the crash condition. In particular, the plate 215 has openings 220 disposed intermediate the guides 216. The energy absorbing mechanism 218 includes a housing 222, which is disposed within one of the openings 220. A plastically deformable strap 224 having opposed ends 226 extends from the release bracket 32 through the opening 220 and housing 222 to the exterior of the plate 215. One end 226 of the strap 224 has a hole 228 therethrough. A connecting member 230 extends from the upper jacket 40 adjacent the rear opening 42. The connecting member 230 includes a bore 232 complementary to the hole 228. A screw 234 is disposed within the hole 228 and bore 232 to connect the end 226 of the strap 224 to the connecting member 230.

Although the energy absorbing mechanism 218 of the assembly 20 utilizes an S-strap, one skilled in the art will appreciate that other energy-absorbing straps and/or devices may be used, including but not limited to those which employ one or more M-straps, J-straps, other straps, wires, pyrotechnic or other actuating devices, or a combination thereof.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly comprising;
   a mounting bracket including longitudinally extending spaced sidewalls having inner surfaces facing toward one another,
   a release bracket having longitudinally extending spaced connecting walls interposed between said sidewalls with each of said connecting walls including a rearwardly-opening primary notch with each of said primary notches having top and bottom edges diverging in a rearward direction at a predetermined angle,
   a steering column mounted to said release bracket, and
   shear capsules having top and bottom surfaces diverging in a rearward direction at the same angle as said top and bottom edges of a selected one of said primary notches and slidably engaging said top and bottom edges of said primary notch and fixed to said mounting bracket for coupling and supporting said release bracket against separation from said mounting bracket in response to application of axial shear force below a predetermined threshold valve and being responsive to application of an axial shear force above said threshold valve to cause said capsules to separate from said release bracket to permit longitudinal movement of said release bracket relative to said mounting bracket in the direction of said shear force, each of said sidewalls of said mounting bracket including a secondary notch with said shear capsules connected to said mounting bracket by being disposed within a selected one of said secondary notches for coupling said connecting wall with said sidewalls, and at least one of said top and bottom edges of each of said primary notches having an indentation and each of said capsules including a hole with a shear pin disposed within said hole and extending through said indentation for normally resisting collapse of said steering column and shearing in response to the collision event for releasing said connecting wall from said capsule.

2. An assembly as set forth in claim 1 wherein said top and bottom surfaces of each of said capsules have grooves therein slidably engaging said top and bottom edges of said primary notches.

3. An assembly as set forth in claim 1 further including a tab disposed on each of said sidewalls adjacent said secondary notch and extending transversely from said sidewall in abutting engagement with said capsule.

4. An assembly as set forth in claim 3 wherein said tab and said capsules each have a bore extending therethrough and further including a bolt received within said bores to thereby rigidly anchor each of said capsules to a selected one of said tabs.

5. An assembly as set forth in claim 4 wherein each of said sidewalls includes an end edge interconnecting said upper and lower edges with said tab extending from said end edge at a perpendicular angle to said sidewall.

6. An assembly as set forth in claim 5 wherein said bolt extends parallel to the longitudinal axis of said mounting bracket.

7. An assembly as set forth in claim 1 wherein said release bracket includes a housing for receiving a selected one of said capsules therein.

8. An assembly as set forth in claim 7 wherein said mounting bracket includes a plate interconnecting said sidewalls and a guide protruding from said plate and frictionally engaging said housing for guiding movement of said housing upon release of said connecting wall from said capsule.

9. An assembly as set forth in claim 8 wherein said guide comprises a ridge extending parallel to the longitudinal axis of said mounting bracket.

10. An assembly as set forth in claim 9 further including an energy absorbing device interconnecting said release bracket and said plate for absorbing energy upon movement of said release bracket relative to said mounting bracket in response to the crash condition.

11. An assembly as set forth in claim 10 wherein said top and bottom surfaces of said capsule have grooves therein slidably engaging said top and bottom edges of said primary notch.

12. A steering column assembly comprising;

a mounting bracket for attachment to a vehicle subassembly and including a plate having spaced parallel sidewalls extending therefrom, a release bracket having spaced parallel connecting walls interposed between said sidewalls, a steering column having an outer jacket carried by said release bracket, at least one of said connecting walls including a rearwardly-opening primary notch having top and bottom edges diverging in a rearward direction at a predetermined angle with at least one of said top and bottom edges including an indentation therein, at least one of said sidewalls including a rearwardly-opening secondary notch having upper and lower edges diverging in a second rearward direction at a second predetermined angle and an end edge interconnecting said upper and lower edges, a shear capsule disposed within said primary and secondary notches for interconnecting said connecting wall with said sidewall and said capsule having a bore and a hole therethrough with top and bottom surfaces diverging in a rearward direction at the same angle as said top and bottom edges of said primary notch for slidably engaging said top and bottom edges and grooves for slidably engaging said top and bottom edges of said primary, notch, a shear pin disposed within said hole and extending through said indentation for normally resisting collapse of said steering column and shearing in response to the collision event for releasing said connecting wall from said capsule, a tab having a bore and extending from said end edge at a perpendicular angle to said sidewall in abutting engagement with said capsule, a bolt received within said bores in said capsule and said tab and extending parallel to the longitudinal axis of said mounting bracket, a housing carried by said release bracket and for receiving said capsule therein, at least one guide protruding from said plate parallel to the longitudinal axis of said mounting bracket and frictionally engaging said housing for guiding movement of said release bracket upon release of said connecting wall from said capsule, and an energy absorbing device interconnecting said release bracket and said plate for absorbing energy upon movement of said release bracket relative to said mounting bracket in response to the crash condition.

13. A steering column assembly comprising;

a mounting bracket including longitudinally extending spaced sidewalls having inner surfaces facing toward one another, a release bracket having longitudinally extending spaced connecting walls interposed between said sidewalls with each of said connecting walls including a rearwardly-opening primary notch with each of said primary notches having top and bottom edges diverging in a rearward direction at a predetermined angle, a steering column mounted to said release bracket, and shear capsules having top and bottom surfaces diverging in a rearward direction at the same angle as said top and bottom edges of a selected one of said primary notches and slidably engaging said top and bottom edges of said primary notches and fixed to said mounting bracket for coupling and supporting said release bracket against separation from said mounting bracket in response to application of axial shear force below a predetermined threshold valve and being responsive to application of an axial shear force above said threshold valve to cause said capsules to separate from said release bracket to permit longitudinal movement of said release bracket relative to said mounting bracket in the direction of said shear force, each of said sidewalls of said mounting bracket including a secondary notch with each secondary notch having upper and lower edges diverging in a rearward direction at a predetermined angle with said top and bottom surfaces of said shear capsules engaging said upper and lower edges of said secondary notches for coupling said connecting walls with said sidewalls.

14. An assembly as set forth in claim 13 further including a tab disposed on each of said sidewalls adjacent said secondary notch and extending transversely from said sidewall in abutting engagement with said capsule.

15. An assembly as set forth in claim 14 wherein said tab and said capsules each have a bore extending therethrough and further including a bolt received within said bores to thereby rigidly anchor each of said capsules to a selected one of said tabs.

16. An assembly as set forth in claim 13 wherein said bolt extends parallel to the longitudinal axis of said mounting bracket.

* * * * *